United States Patent
Ubukata et al.

(10) Patent No.: US 8,862,365 B2
(45) Date of Patent: Oct. 14, 2014

(54) VEHICULAR POWER SUPPLY DEVICE

(75) Inventors: Takayuki Ubukata, Chiyoda-ku (JP); Naoki Itoi, Chiyoda-ku (JP); Nobuhiro Kihara, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 434 days.

(21) Appl. No.: 13/253,529

(22) Filed: Oct. 5, 2011

(65) Prior Publication Data

US 2012/0316749 A1 Dec. 13, 2012

(30) Foreign Application Priority Data

Jun. 8, 2011 (JP) ................. 2011-127994

(51) Int. Cl.
*F02D 28/00* (2006.01)
*B60R 16/03* (2006.01)
*F02N 11/08* (2006.01)

(52) U.S. Cl.
CPC ......... *B60R 16/03* (2013.01); *F02N 2011/0888* (2013.01); *F02N 11/0866* (2013.01); *F02N 11/0814* (2013.01)
USPC ........................ 701/102; 123/179.3

(58) Field of Classification Search
CPC ......... F02D 28/00; F02D 29/02; F02D 31/00; F02D 41/00; F02D 41/22; F02D 41/26; F02D 45/00; F02N 11/08; F02N 15/00; G06F 19/00
USPC ............... 701/102, 110, 112–114; 123/179.1, 123/179.3, 179.4; 180/65.265, 28, 29; 290/40 B, 40 C, 50, 51; 903/905, 907; 307/10.6
See application file for complete search history.

(56) References Cited

U.S. PATENT DOCUMENTS

| 7,266,441 | B2 * | 9/2007 | Shim ............................. 701/112 |
| 8,531,053 | B2 * | 9/2013 | Choi et al. ..................... 307/9.1 |
| 2002/0157882 | A1 * | 10/2002 | Kubo et al. ................... 180/65.3 |
| 2002/0158513 | A1 * | 10/2002 | Amano et al. ............... 307/10.6 |
| 2006/0038532 | A1 * | 2/2006 | Taniguchi ..................... 320/103 |
| 2006/0232238 | A1 * | 10/2006 | Horii ............................. 320/104 |
| 2009/0306843 | A1 * | 12/2009 | Jinno et al. ..................... 701/22 |
| 2010/0115927 | A1 * | 5/2010 | Sano et al. ...................... 60/287 |
| 2011/0048822 | A1 * | 3/2011 | Kaltenbach et al. ........ 180/65.25 |
| 2011/0266865 | A1 * | 11/2011 | Okabe et al. ................. 307/10.6 |

FOREIGN PATENT DOCUMENTS

| JP | 2010-53794 A | 3/2010 |
| JP | 2010-104123 A | 5/2010 |

* cited by examiner

*Primary Examiner* — John Kwon
*Assistant Examiner* — Johnny H Hoang
(74) *Attorney, Agent, or Firm* — Sughrue Mion, PLLC; Richard C. Turner

(57) ABSTRACT

A vehicular power supply device mounted on a vehicle equipped with an idle stop function is provided that enhances engine startability and suppresses a voltage drop at a battery driving the starter, so as to reduce energy consumption by the engine or other drive sources. The device includes a voltage converter for converting a DC voltage V1 output from a generator into a DC voltage control value V2 and for outputting the value, and when the idle-stop determination unit determines that the engine is in the idle stop state, the voltage converter outputs, depending on a current and voltage supplied to an electrical load including a starter, a second DC voltage control value V2a higher than a first DC voltage control value V2 that is a target output voltage for the battery.

6 Claims, 11 Drawing Sheets

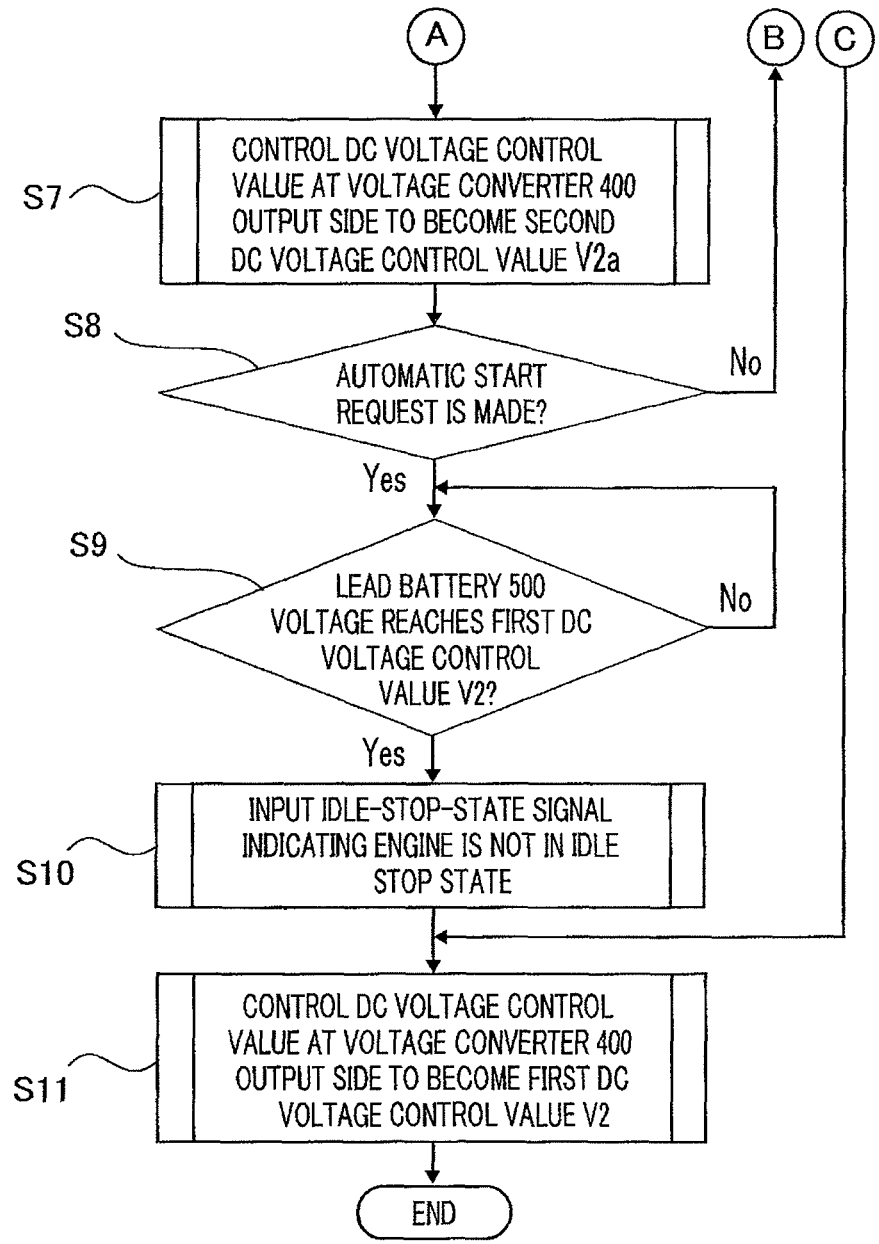

VEHICULAR POWER SUPPLY DEVICE

BACKGROUND OF THE INVENTION

1. Field of the Invention

The present invention relates to a vehicular power supply device mounted on a vehicle equipped with an idle stop function of automatically stopping/starting the engine (internal combustion engine) serving as a drive source of the vehicle.

2. Description of the Related Art

In order to decrease burdens on the environment, vehicles equipped with an idle stop function (automatic stop/start system) have been increasing in number in recent years, aiming at enhancing gas mileage. Those vehicles equipped with the idle stop function frequently repeat an automatic stop/start in running in urban areas and the like; therefore, it has now turned out to be technical issues how to reduce racing of the engine revolution speed and noise, secure startability of the engine and suppress a voltage drop at the lead battery at the automatic start.

In Patent Document 1, in a vehicle equipped with the idle stop function and with both a generator and a starter, its generation voltage is kept raised in automatically starting, whereby the racing of the engine revolution speed is prevented from occurring at the automatic start.

In Patent Document 2, electric power generated by the generator is stored in a battery, whereby power generation is stopped while the battery is being discharged, and energy consumption in the drive source such as the internal combustion engine can be reduced, thereby stabilizing generation output from the generator as well as securing engine startability by the operation of a starting means.

Patent Document 1: Japanese Laid-Open Patent Publication No. 2010-53794
Patent Document 2: Japanese Laid-Open Patent Publication No. 2010-104123

However, in the configuration shown in Patent Document 1, the lead battery voltage is lowered by discharging of the battery attributed to the operation of the starting means at the automatic start, and as a result, electrical equipment is reset, causing a problem of malfunctions occurring. Moreover in order to secure the engine startability, the generation voltage is likely to become zero, causing also another problem in that the power generation is unstable after the automatic start.

Moreover in the configuration of Patent Document 2, the engine startability by the operation of the starting means at the automatic start is secured by stopping the generator at the automatic start; however, the lead battery voltage is dropped by the discharging of the battery attributed to the operation of the starting means, causing another problem of malfunctions occurring with the electrical equipment reset.

SUMMARY OF THE INVENTION

The present invention has been made to resolve the foregoing problems and aims at providing a vehicular power supply device in which engine startability can be enhanced by the operation of the starting means at the engine start, whereby the voltage drop at the lead battery attributed to the operation of the starting means can be suppressed, and as a result, energy consumption in the internal combustion engine can be reduced after the automatic start.

A vehicular power supply device according to the present invention is mounted on a vehicle equipped with an idle stop function of stopping the engine when conditions for stopping the engine are met and starting the engine by the operation of a starting means when conditions for starting the engine are met, and comprises: a generator connected to the engine, for generating a DC voltage; a voltage converter for converting the DC voltage output from the generator into a first DC voltage control value and outputting the value; a battery connected between the generator and the voltage converter; an electrical load including the starting means, supplied with a current and a voltage by way of the voltage converter; a lead battery charged with the output from the voltage converter, for supplying a current to the electrical load; and an idle-stop determination unit for determining whether or not the engine is in an idle stop state; wherein when the idle-stop determination unit determines that the engine is in the idle stop state, the voltage converter outputs, depending on the current and the voltage supplied to the electrical load, a second DC voltage control value that is higher than the first DC voltage control value.

According to the present invention, a vehicular power supply device can be provided that is mounted on a vehicle equipped with an idle stop function, and enhances engine startability by the operation of the starting means as well as suppresses the voltage drop at the lead battery attributed to the operation of the starting means, so as to reduce energy consumption in the engine or other drive sources.

The foregoing and other object, features, aspects and advantages of the present invention will become more apparent from the following detailed description of the present invention when taken in conjunction with the accompanying drawings.

BRIEF DESCRIPTION OF THE DRAWINGS

FIG. 3A and FIG. 3B each are a flowchart for controlling the voltage converter of the vehicular power supply device according to Embodiment 1 of the invention;

DETAILED DESCRIPTION OF THE PREFERRED EMBODIMENTS

Embodiment 1

Figure 1:
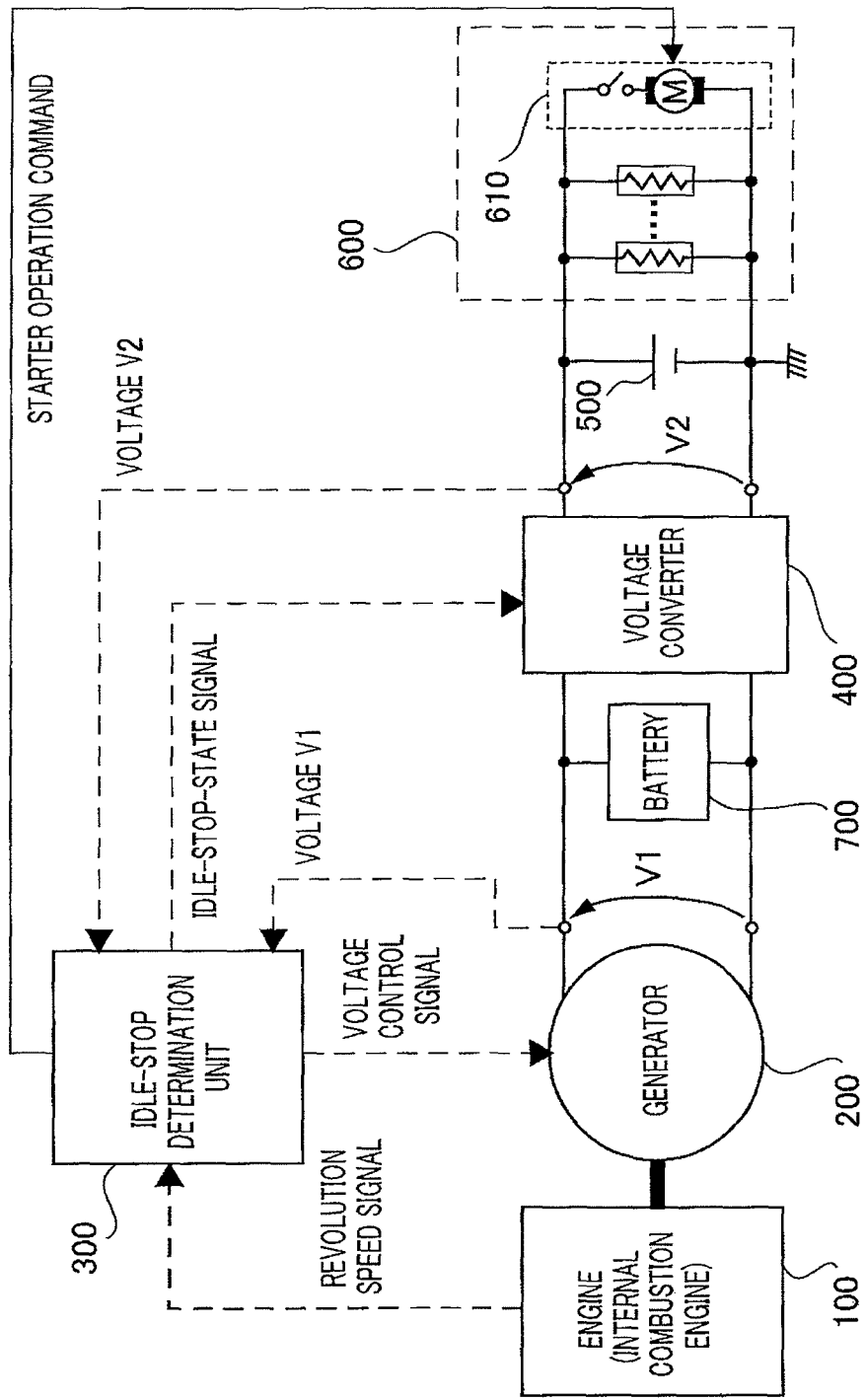
FIG. 1 is a diagram showing the configuration of a vehicular power supply device according to Embodiment 1 of the present invention.

FIG. 1 shows a configuration diagram for a vehicular power supply device according to Embodiment 1 of the present invention. A generator 200 shown in FIG. 1 is, for example, an alternator or MG (Motor-Generator) including a rectifier, which is mechanically connected by a belt to a revolving portion of an engine 100 (internal combustion engine, not shown in the figure). An idle-stop determination unit 300 is an ECU, for example, which computes a target DC voltage generated by the generator 200 and controls a voltage generated by the generator 200 to become the target DC voltage. A battery 700 is an electric double layer capacitor, for example, which is charged with a DC voltage of V1 output from the generator 200, and supplies an onboard electrical load 600 with a current by way of an voltage converter 400. The voltage converter 400 converts the DC voltage V1 output from the generator 200 into a first DC voltage control value V2 and outputs the resultant value. The reference numeral 500 denotes a lead battery and the reference numeral 600, the onboard electrical load; both are connected to the output side of the voltage converter 400. Therefore, the first DC voltage control value V2 output from the voltage converter 400 becomes a target output voltage for the lead battery connected to the output side thereof. The onboard electrical load 600 includes a starter 610 as a starting means.

The starter 610 connected with the lead battery 500 is connected to the idle-stop determination unit 300 that stops and starts the engine. The idle-stop determination unit 300 performs an idle stop that automatically stops the engine revolution by interrupting combustion (ignition and/or fuel injection) of the engine 100 when an idle stop request is made with predetermined stop conditions (such as completely releasing gas pedal, during idle revolution, during a vehicle stop and after warming-up) met during the engine operation, and operates to start the engine by activating the starting means when an automatic start request is made with the driver performing operation to start the vehicle (such as depressing the gas pedal) or preparatory operation to start the vehicle (such as releasing brake operation and shifting the shift lever to any running range) during this idle stop.

Figure 2:
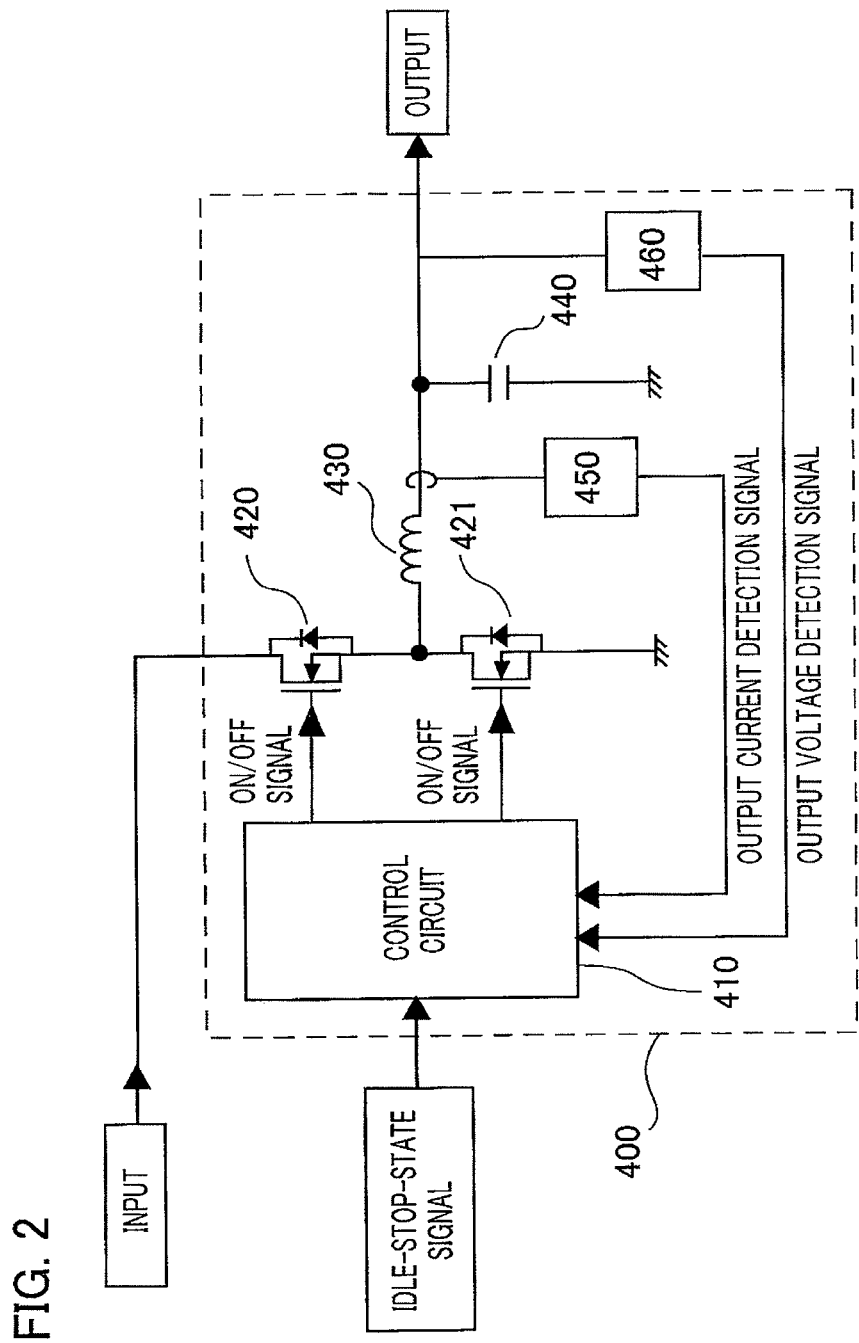
FIG. 2 is a diagram showing the configuration of a voltage converter according to Embodiment 1 of the invention.

FIG. 2 shows the configuration of the voltage converter 400. The voltage converter 400 is, for example, a step-down DC-DC converter including a control circuit 410, semiconductor switching elements 420 and 421 made up of MOSFETs, IGBTs or the like, a reactor 430, a smoothing capacitor 440, a current detection means 450 and a voltage detection means 460. A diode or the like may be used for the switching element 421.

A voltage-conversion-control means of the voltage converter 400 will be explained next. A DC voltage input to the voltage converter 400 is input to a voltage-conversion circuit including the semiconductor switching elements 420 and 421, the reactor 430 and the smoothing capacitor 440. The control circuit 410 determines, depending on a detected output voltage by the voltage detection means 460 (for example, detected by dividing the output voltage by resisters), an ON time for the switching element 420 so that the converter output voltage becomes a required value. The control circuit switches ON and OFF the switching element 420 by inputting to the gate of the switching element 420 the ON time in the form of a pulse signal, for example, and controls the element so that the output voltage can be made the predetermined value. Moreover, the voltage converter 400 includes therein the current detection means 450 (that detects a current by, for example, a shunt resister or a current sensor) for the purpose of protecting against an overcurrent and controlling the current therethrough. The voltage converter 400 transforms the DC voltage V1 output from the generator 200 into the first DC voltage control value V2 in the manner as described above and outputs the value.

Figure 3A:
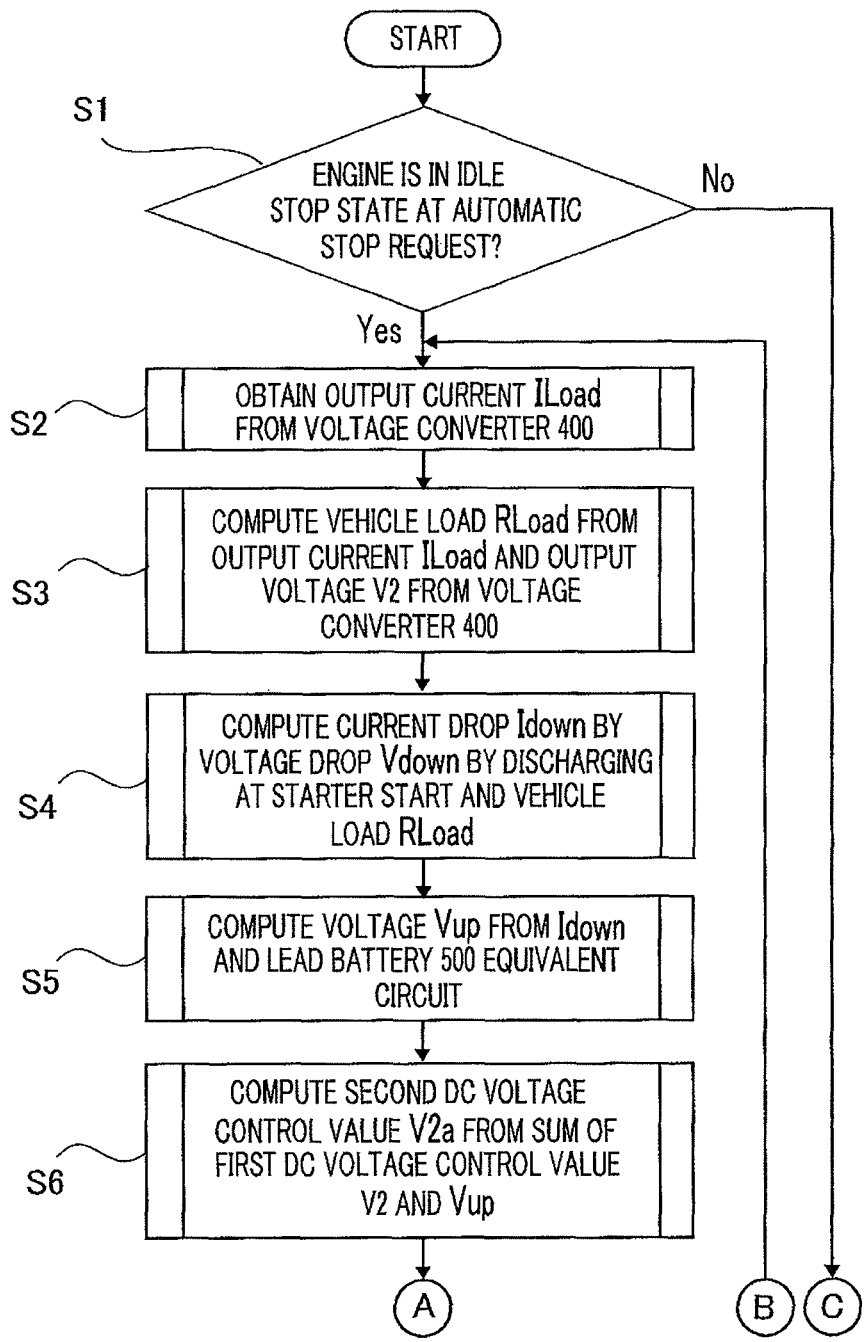

Next, in a vehicle equipped with the idle stop function as configured above, control flow for the voltage-conversion-control means of the voltage converter 400, from an idle stop until after an automatic start will be explained referring to the flowchart of FIG. 3A and FIG. 3B.

In Step S1, the idle-stop determination unit 300 determines whether or not the engine is in an idle stop state at an automatic stop request. If it is in the idle stop state, the idle-stop determination unit 300 outputs to the voltage converter 400 an idle-stop-state signal indicating that the engine is in the idle stop state, and in order that the voltage converter 400, based on the input idle-stop-state signal, can control the DC voltage at the output side thereof to become a second DC voltage control value V2a that is higher than the first DC voltage control value V2, Step S2 ensues so that the second DC voltage control value V2a is determined. If the idle-stop-state signal indicates that the engine is not in the idle stop state, Step S11 ensues.

In Step S2, in order to determine the second DC voltage control value V2a, the voltage converter 400 obtains an output current $I_{Load}$ supplied to the electrical load of the vehicle and the output voltage V2 from the current detection means 450 and the voltage detection means 460, respectively, and then Step S3 ensues. Since the output current $I_{Load}$ obtained from the voltage converter 400 at this moment is a current supplied to the electrical load of the vehicle, the current turns out to be an output current from the lead battery in the idle stop state. Moreover, since the lead battery is connected to the output side of the voltage converter, the output voltage V2 from the voltage converter 400 becomes the same as the lead battery output voltage.

In Step S3, the voltage converter 400 computes the volume of vehicle electrical load $R_{Load}$ from the output current $I_{Load}$ and output voltage V2 obtained in Step S2, using Equation 1 given below. The output current and output voltage obtained in Step S3 are a current and voltage supplied to the electrical load of the vehicle in the idle stop state; therefore, the volume of vehicle electrical load $R_{Load}$ computed by Equation 1 given below is a minimum volume of the electrical load that is necessary for the electrical load of the vehicle in the idle stop state.

$$R_{Load}=V2/I_{Load} \quad \text{(Equation 1)}$$

In Step S4, the voltage converter 400 computes a current drop $I_{down}$ caused by a voltage drop at the lead battery 500 attributed to the operation of the starter 610, from the volume of vehicle electrical load $R_{Load}$ computed in Step S3 and the voltage drop $V_{down}$ at the lead battery 500 attributed to the operation of the starter 610 (that may be stored in advance as data in the voltage converter 400, for example).

$$I_{down}=V_{down}/R_{Load} \quad \text{(Equation 2)}$$

In Step S5, the voltage converter 400 computes from the current drop $I_{down}$ computed in Step S4 a voltage of $V_{up}$ that enables the electrical load of the vehicle to operate even when the lead battery 500 voltage is dropped attributed to the operation of the starter 610, using the equivalent circuit of the lead battery shown in FIG. 4 and Equation 3 given below.

Figure 4:
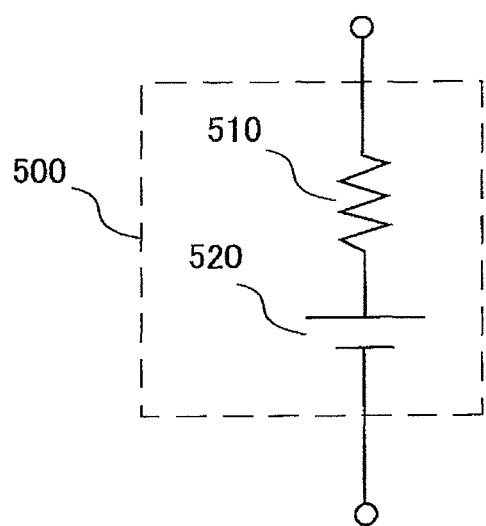
FIG. 4 is an equivalent circuit diagram for simulating a lead battery according to Embodiment 1 of the invention.

The equivalent circuit of the lead battery 500 shown in FIG. 4 includes an internal resistance 510 and an electromotive force 520.

If a current flows through the internal resistance 510, the voltage across the resistance increases; therefore, the voltage $V_{up}$ that enables the electrical load of the vehicle to operate can be computed from the current drop $I_{down}$ computed in Step S4 and the internal resistance 510 of the lead battery 500, using Equation 3 given below.

Although this Equation 3 is obtained from the equivalent circuit shown in FIG. 4, the internal resistance varies depending on the type of the lead battery 500 and a charging state thereof; therefore, the voltage needs to be computed using an equivalent circuit in accordance with the type of the lead battery 500 and the charging state thereof. Moreover, there is also a method of carrying out computation in such a way that the output current $I_{Load}$ obtained in Step S2 and the voltage $V_{up}$ with respect to V2 are stored in advance as map data, so as to directly compute the voltage $V_{up}$.

$$V_{up} = I_{down} R_{vb} \quad \text{(Equation 3)}$$

where $R_{vb}$ is the value of the internal resistance 510.

Moreover, the voltage $V_{up}$ computed in Step S5 can be determined not only linearly as following Equation 3 but also stepwise such as high voltage, mid voltage and low voltage depending on the current drop $I_{down}$.

In Step S6, the voltage converter 400 computes the second DC voltage control value V2a from the voltage $V_{up}$ computed in Step S5 and the first DC voltage control value V2, using Equation 4 as below.

$$\text{Second DC voltage control value } V2a = V_{up} + \text{First DC voltage control value } V2 \quad \text{(Equation 4)}$$

In Step S7, the voltage converter 400 controls the DC voltage at the output side thereof to become the second DC voltage control value V2a computed in Step S6. At this moment, the voltage converter 400 controls the DC voltage at the output side to become the second DC voltage control value V2a; however, the voltage converter 400 is directly connected to the lead battery 500 and serves to deal with a large current. Therefore, from the view point of prevention against a surge in current, the voltage converter 400 is set to gradually vary the DC voltage at the output side thereof to become the second DC voltage control value V2a.

Furthermore, when the voltage converter 400 controls the DC voltage at the output side thereof to become the second DC voltage control value V2a in Step S7, the converter can vary the rate of varying the voltage. For example, when the second DC voltage control value V2a is high, the rate of varying the DC voltage at the output side can be made slower, whereas when it is low, the rate of varying the DC voltage can be made faster.

In Step S8, the idle-stop determination unit 300 determines whether an automatic start request is made. If an automatic start request is made, Step S9 ensues, whereas if not, Step S2 recurs, and the second DC voltage control value V2a is determined and controlled from the volume of electrical load of the vehicle.

In Step S9, the idle-stop determination unit 300 determines, from the voltage of the lead battery 500 when the engine is started by the operation of the starter 610 at the automatic start request, whether or not the voltage converter 400 to control the DC voltage at the output side thereof to become the first DC voltage control value V2. After the voltage of the lead battery 500 has been dropped attributed to the operation of the starter 610, if the voltage of the lead battery does not reach the first DC voltage control value V2 by charging by the voltage converter 400, Step S9 continues. If the voltage of the lead battery 500 reaches the first DC voltage control value V2, Step S10 ensues.

In Step S10, the idle-stop determination unit 300 determines that starting the engine has been completed by finding the voltage of the lead battery 500 reaches the second DC voltage control value V2a, and then outputs to the voltage converter 400 the idle-stop-state signal indicating that the engine is not in the idle stop state.

In Step S11, the voltage converter 400 controls the DC voltage at the output side thereof to become the first DC voltage control value V2, in response to the input idle-stop-state signal indicating that the engine is not in the idle stop state.

Moreover in Steps S9 to S11, Step S10 or S11 can ensue before the lead battery 500 is charged by the voltage converter 400 so that the voltage thereof reaches the first DC voltage control value V2 after the voltage of the lead battery 500 has been dropped attributed to the operation of the starter 610 in Step S9. For example, the voltage drop at the lead battery 500 is monitored after the starter 610 is operated at the automatic start request in Step S9, and then immediately Step S10 ensues. In Step S10, the idle-stop determination unit determines that the engine is not in the idle stop state by monitoring the voltage drop at the lead battery, and Step S11 ensues. Then in Step S11, the DC voltage at the output side of the voltage converter 400 can be also controlled to become the first DC voltage control value V2.

Moreover in Step S1, if the idle-stop determination unit inputs to the voltage converter 400 the idle-stop-state signal indicating that the engine is not in the idle stop state, the voltage converter 400 continues, in this Step S11, controlling of the DC voltage at the output side thereof to become the first DC voltage control value V2. The above shows the control flow from an idle stop at an automatic stop request until after an automatic start by the voltage-conversion-control means of the voltage converter 400 according to Embodiment 1.

Figure 5:
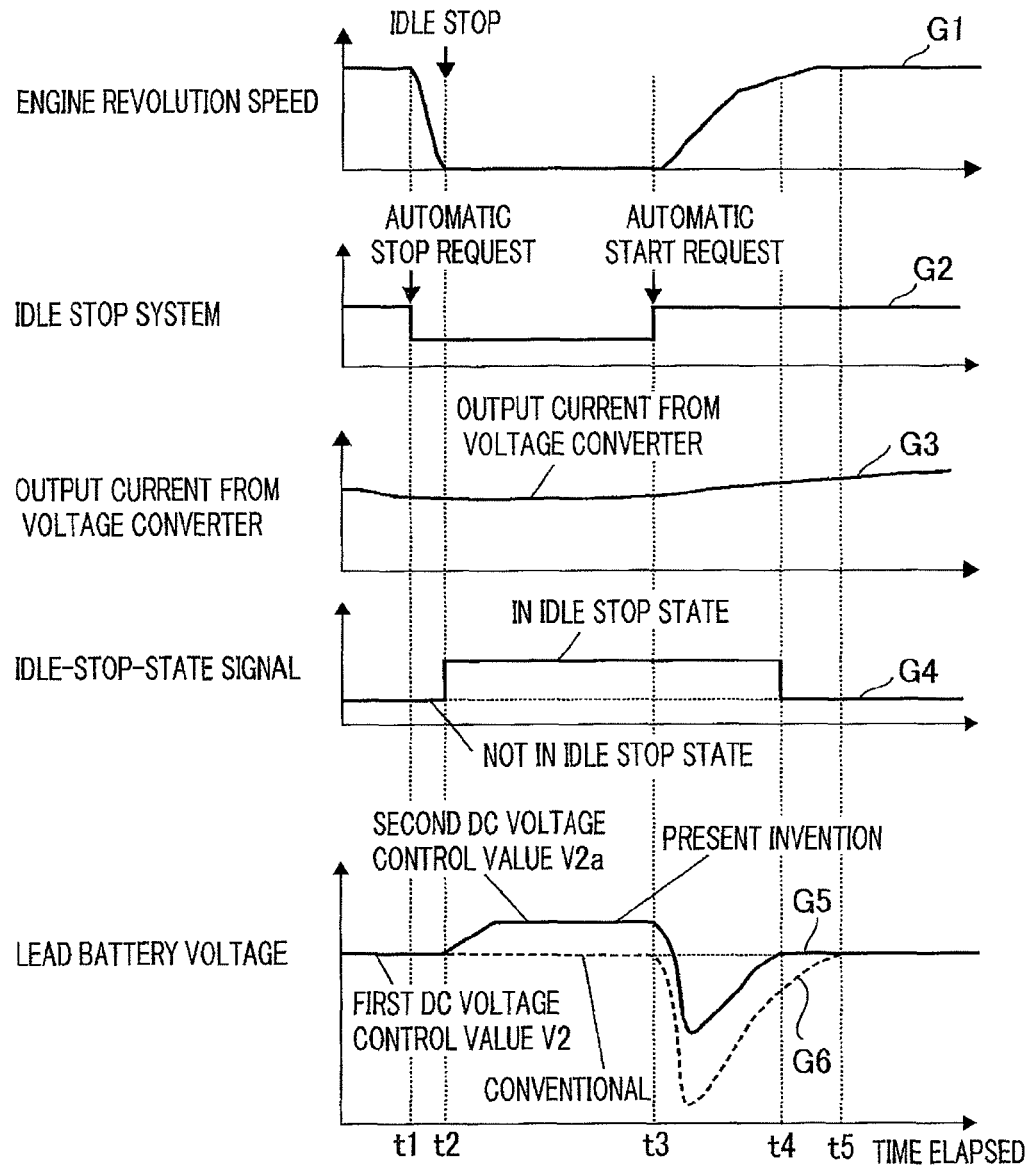
FIG. 5 is a timing chart for explaining the operation of the vehicular power supply device according to Embodiment 1 of the invention.

In FIG. 5 are shown, over the period from the idle stop until after the automatic start, the engine rotation speed, the idle-stop-state signal, the output current from the voltage converter 400, the DC voltage control value at the output side of the voltage converter 400 and a timing chart for the voltage of the lead battery 500, as the result of the control flow carried out by the voltage-conversion-control means of the voltage converter 400 according to this Embodiment 1.

Graph G1 of FIG. 5 represents a transition of the rotation speed of the engine 100; Graph G2, the automatic stop and automatic start requests made by the idle stop system; Graph G3, the output current from the voltage converter 400; Graph G4, the idle-stop-state signal from the idle-stop determination unit 300; Graph G5, a transition of the voltage of the lead battery 500 according to the present invention; and Graph G6, that of the lead battery 500 according to a conventional device.

Time t1 is a time when the automatic stop request is made based on idle stop conditions. Since idle-stop determination unit 300 goes into operation of stopping the engine after time t1, the engine revolution speed begins decreasing.

Time t2 is a time when the engine revolution speed decreases to zero, and also a time at which the idle-stop determination unit 300 determines that the engine is in the idle stop state. At this moment, the idle-stop determination unit 300 transmits to the voltage converter 400 the idle-stop-state signal indicating that the engine is in the idle stop state. Then, the voltage converter 400 determines, based on the idle-stop-state signal, whether to control the DC voltage control value at the output side thereof to become the first DC voltage control value V2 or to become the second DC voltage control value V2a. This idle-stop-state signal may be an ON/OFF signal such as ON when the engine is in the idle stop state and OFF when not in the idle stop state. When the ON signal is input, the voltage converter 400 determines that the engine is in the idle stop state and then takes voltage-conversion control such that the DC voltage control value at the output side becomes the second DC voltage control value V2a, whereas the OFF signal is input, the converter determines that it is not in the idle stop state and then takes voltage-conversion control such that the DC voltage control value at the output side becomes the first DC voltage control value V2.

Time t3 is a time when the automatic start request is made by the idle stop system in order to start the engine 100. On receiving the automatic start request, the idle-stop determination unit 300 starts the engine 100 by the operation of the starter 610. And then, the voltage of the lead battery 500 is dropped attributed to the operation of the starting means. The lead battery 500 is charged by the voltage converter 400 after the voltage thereof has been dropped, so that the voltage thereof rises up.

Time t4 is a time when the voltage of the lead battery 500 reaches the first DC voltage control value V2 according to the present invention, and also a time when the idle-stop determination unit 300 outputs to the voltage converter 400 the idle-stop-state signal indicating that the engine is not in the idle stop state. The voltage converter 400, based on the idle-stop-state signal input from the idle-stop determination unit 300, controls the DC voltage at the output side thereof to become the first DC voltage control value V2.

Time t5 is a time when the voltage of the lead battery 500 according to the conventional device reaches the first DC voltage control value V2. This shows that according to the present invention, the DC voltage control value at the output side of the voltage converter 400 is controlled to become the second DC voltage control value V2a in the idle stop state, and then the engine 100 is automatically started by activating the starter 610, whereby the voltage drop at the lead battery 500 can be suppressed.

In Steps S2 to S10 described above, the DC voltage control value V2 in the idle stop state at the output side of the voltage converter 400 is controlled to become the second DC voltage control value V2a. Even if the automatic stop request is made in Step S1, if the driver takes actions such as accelerating again before the idle stop starts, the engine 100 remains revolving, which therefore does not bring any unpleasant feeling to the driver and the driver can continue driving. Moreover, the second DC voltage control value V2a is determined based on the volume of electrical load of the vehicle in the idle stop state in which the load is light, consumption of energy from the battery 700 can also be minimized.

Alternatively, if the automatic stop request is made by the idle stop system in Step S1, the DC voltage control value at the output side of the voltage converter 400 is controlled to become the second DC voltage control value V2a before the idle-stop determination unit 300 determines that the engine is in the idle stop state, whereby when the time from the idle stop to the automatic start is short, the voltage drop at the lead battery 500 attributed to the operation of the starter 610 can be suppressed. Moreover, even if the driver takes actions such as accelerating again before the idle-stop determination unit 300 determines that the engine is in the idle stop state after the automatic start request is made, the engine remains revolving, which therefore does not bring any unpleasant feeling to the driver, the driver can continue driving, and the voltage converter 400 only has to control the DC voltage control value at the output side thereof to become the first DC voltage control value V2.

Conventionally, the voltage drop at the lead battery attributed to the operation of the starter 610 in automatically starting is large, and in addition, it takes a time before the dropped voltage is raised, which has caused concern about occurrences of various failures of the electrical load.

According to this Embodiment 1, in a vehicle equipped with the idle stop function, the voltage of the lead battery 500 is raised by raising the output voltage from the voltage converter 400 in an idle stop state, and the voltage drop at the lead battery 500 attributed to the operation of the starting means is suppressed in automatically starting, whereby various failures of the electrical load caused by the voltage drop at the lead battery 500 can be prevented from occurring.

Embodiment 2

Figure 6A:
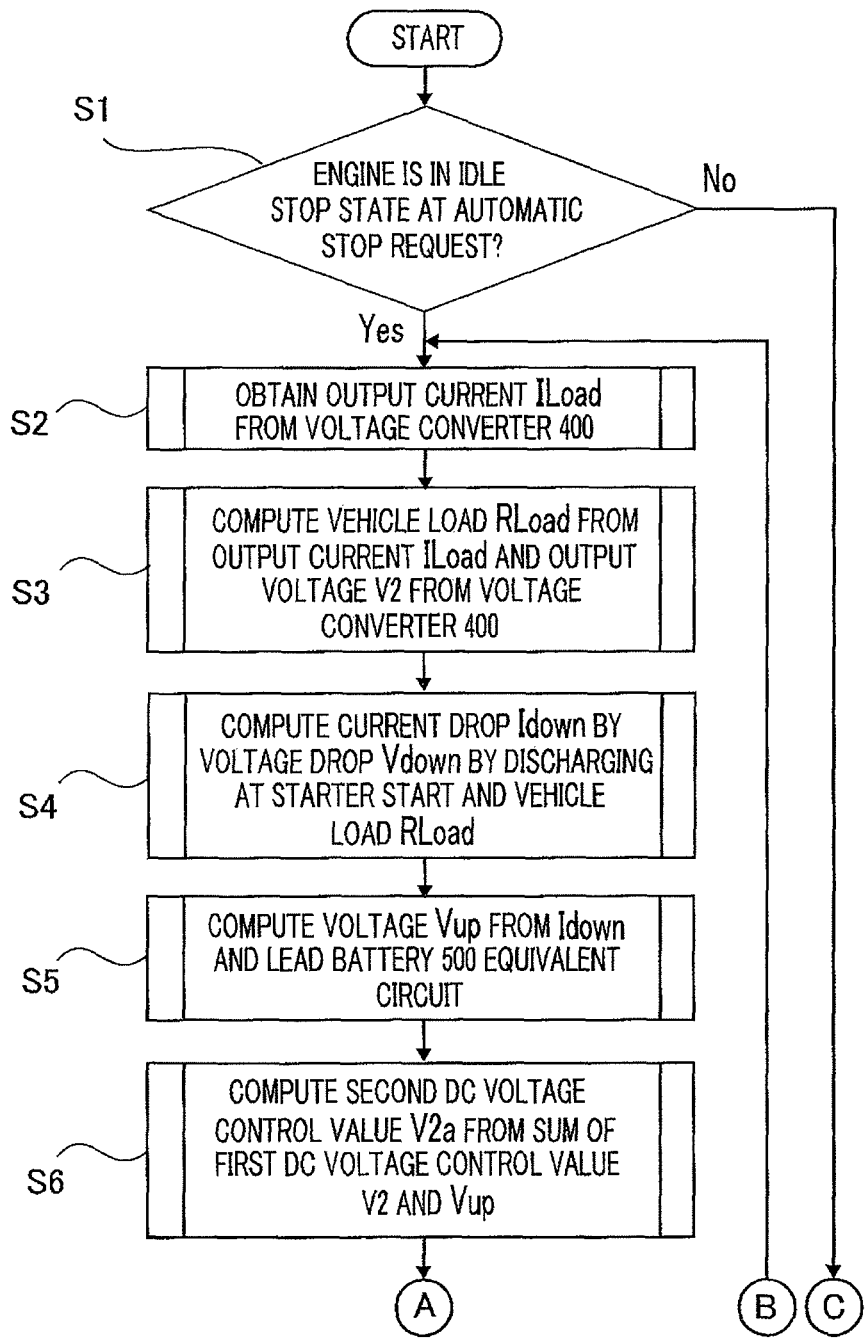
FIG. 6A and FIG. 6B each are a flowchart for controlling a voltage converter of a vehicular power supply device according to Embodiment 2 of the invention.
Figure 6B:
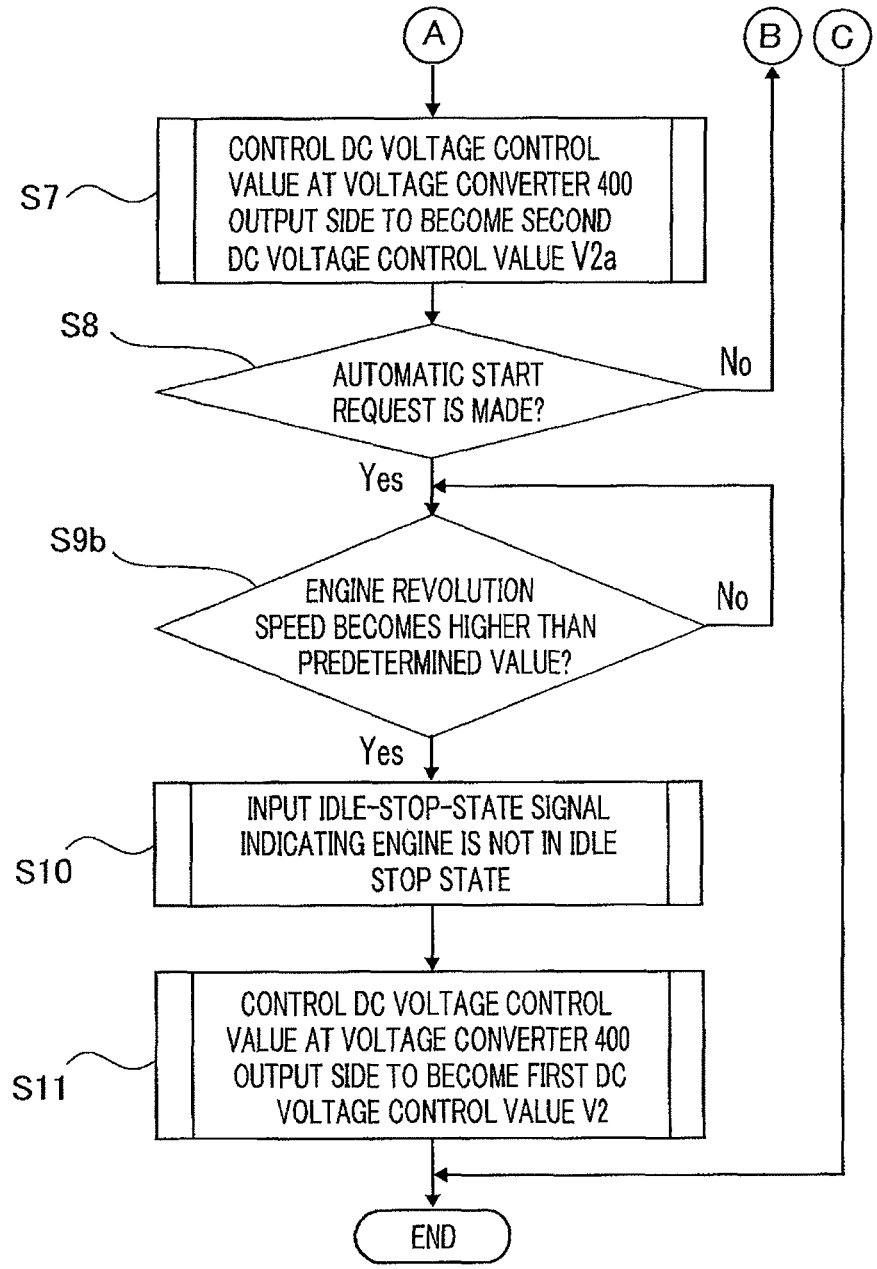

FIG. 6A and FIG. 6B each show a control flow for a voltage converter 400 according to Embodiment 2 of the present invention. Step S9 in Embodiment 1 is replaced with Step S9b here.

In Step S9b, the idle-stop determination unit 300 determines, from the revolution speed of the engine started by the operation of the starter 610 at an automatic start request, whether to control the DC voltage control value at the output side of the voltage converter 400 to become the second DC voltage control value V2a or to become the first DC voltage control value V2. If the engine revolution speed reaches a predetermined value (idle revolution speed, for example) after discharging attributed to the operation of the starter 610 after cranking, Step S10 ensues. Meanwhile, if the engine revolution speed does not reach the predetermined value, Step S9b continues and the voltage converter 400 continues controlling of the DC voltage control value at the output side thereof to become the second DC voltage control value V2a.

In Step S10, when finding the engine revolution speed reaches the predetermined value, the idle-stop determination unit 300 determines that the automatic start has been completed, and outputs to the voltage converter 400 the idle-stop-state signal indicating that the engine is not in the idle stop state.

In Step S11, the voltage converter 400, in response to the input idle-stop-state signal, controls the DC voltage control value at the output side thereof to become the first DC voltage control value V2.

In this Step S11, since the generator 200 has obtained a revolution speed necessary for generation, the generator can quickly charge the battery 700. Thereby, even if the charging voltage of the battery 700 is low, the battery 700 can be quickly charged after the engine is started by the starter 610; therefore the voltage drop at the lead battery 500 can be suppressed even if the voltage of the lead battery 500 does not reach the first DC voltage control value V2.

The above shows the control flow from an idle stop at an automatic stop request until after an automatic start, for the voltage-conversion-control means of the voltage converter 400 according to Embodiment 2.

Figure 7:
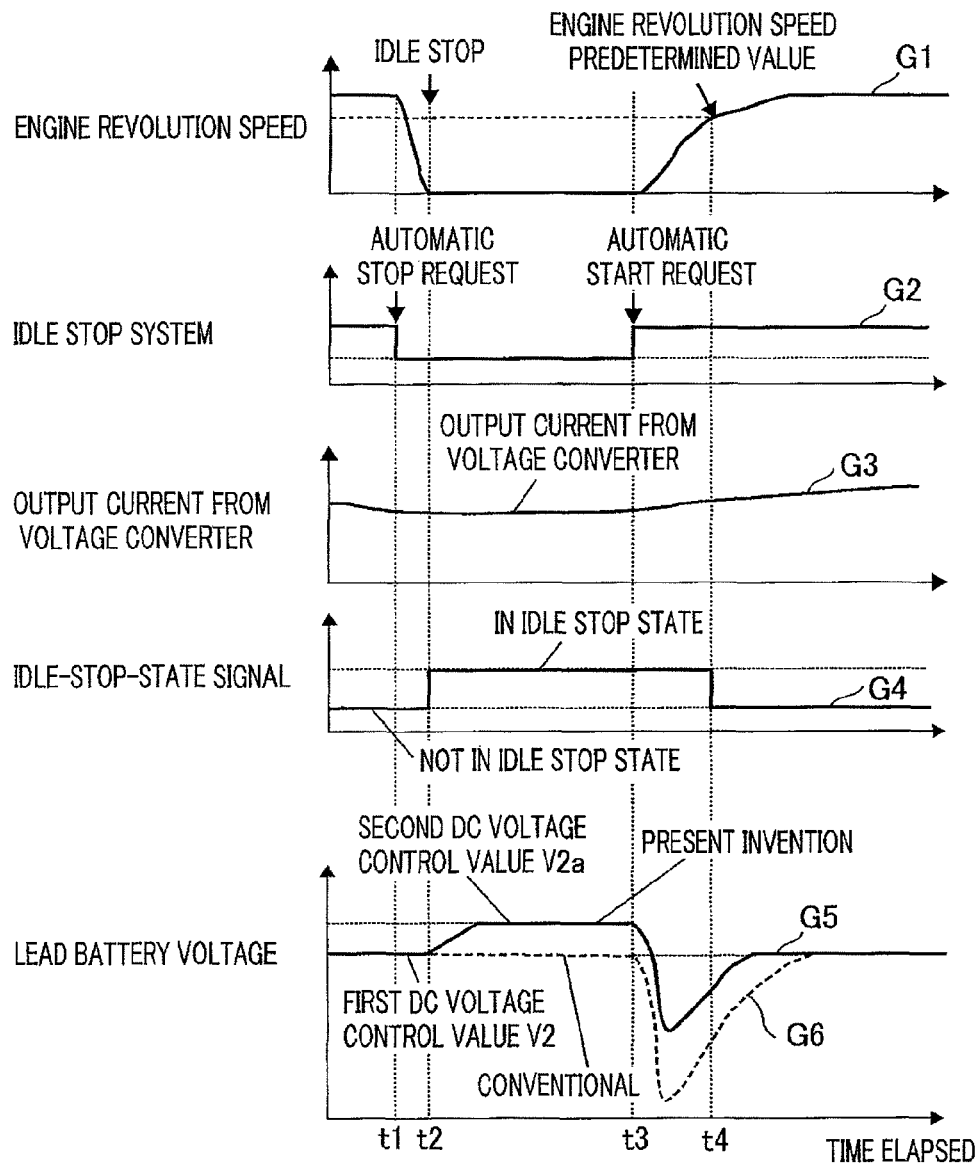
FIG. 7 is a timing chart for explaining the operation of the vehicular power supply device according to Embodiment 2 of the invention.

FIG. 7 shows a timing chart of the voltage of the lead battery 500 from the idle stop at the automatic stop request until after the automatic start, as the result of carrying out the control flow for the voltage converter 400 according to Embodiment 2 of the present invention.

Graph G1 of FIG. 7 represents a transition of the revolution speed of the engine 100; Graph G2, the automatic stop and automatic start requests made by the idle stop system; Graph G3, the output current from the voltage converter 400; Graph G4, the idle-stop-state signal from the idle-stop determination unit 300; Graph G5, a transient of the voltage of the lead battery 500 according to the present invention; and Graph G6, that of the lead battery 500 according to the conventional device.

Time t1 is a time when the automatic stop request is made based on the idle stop conditions. Since idle-stop determination unit 300 goes into operation of stopping the engine after time t1, the engine revolution speed begins decreasing.

Time t2 is a time when the engine revolution speed decreases to zero, and also a time at which the idle-stop determination unit determines that the engine is in the idle stop state. At this moment, the idle-stop determination unit 300 outputs to the voltage converter 400 the idle-stop-state signal indicating that the engine is in the idle stop state. Then, the voltage converter 400 determines, based on the idle-stop-state signal, whether to control the DC voltage control value at the output side thereof to become the first DC voltage control value V2 or to become the second DC voltage control value V2*a*. This idle-stop-state signal may be an ON/OFF signal such as ON when the engine is in the idle stop state and OFF when not in the idle stop state. When the ON signal is input, the voltage converter 400 determines that it is in the idle stop state and then takes voltage-conversion control such that the DC voltage control value at the output side becomes the second DC voltage control value V2*a*, whereas the OFF signal is input, the converter 400 determines that it is not in the idle stop state and then takes voltage-conversion control such that the DC voltage control value at the output side becomes the first DC voltage control value V2.

Time t3 is a time when the automatic start request is made to start the engine 100. On receiving the automatic start request, the idle-stop determination unit 300 starts the engine by the operation of the starter 610. And then, the voltage of the lead battery 500 is dropped attributed to the operation of the starting means. The lead battery 500 is charged by the voltage converter 400 after the voltage thereof has been dropped, so that the voltage of the lead battery rises up.

Time t4 is a time when the revolution speed of the engine 100 reaches the predetermined value in Embodiment 2, and also a time when the idle-stop determination unit 300 outputs to the voltage converter 400 the idle-stop-state signal indicating that the engine is not in the idle stop state. The voltage converter 400, based on the idle-stop-state signal input from the idle-stop determination unit 300, controls the DC voltage control value at the output side thereof to become the first DC voltage control value V2. According to Embodiment 2, this allows the generator 200 to generate power when the engine revolution speed reaches the predetermined value, whereby even when the charging voltage of the battery 700 is low, the battery 700 can be quickly charged after the engine is started by the starter 610; therefore the voltage drop at the lead battery 500 can be suppressed even if the voltage of the lead battery 500 does not reach the second target DC voltage.

Embodiment 3

Figure 8:
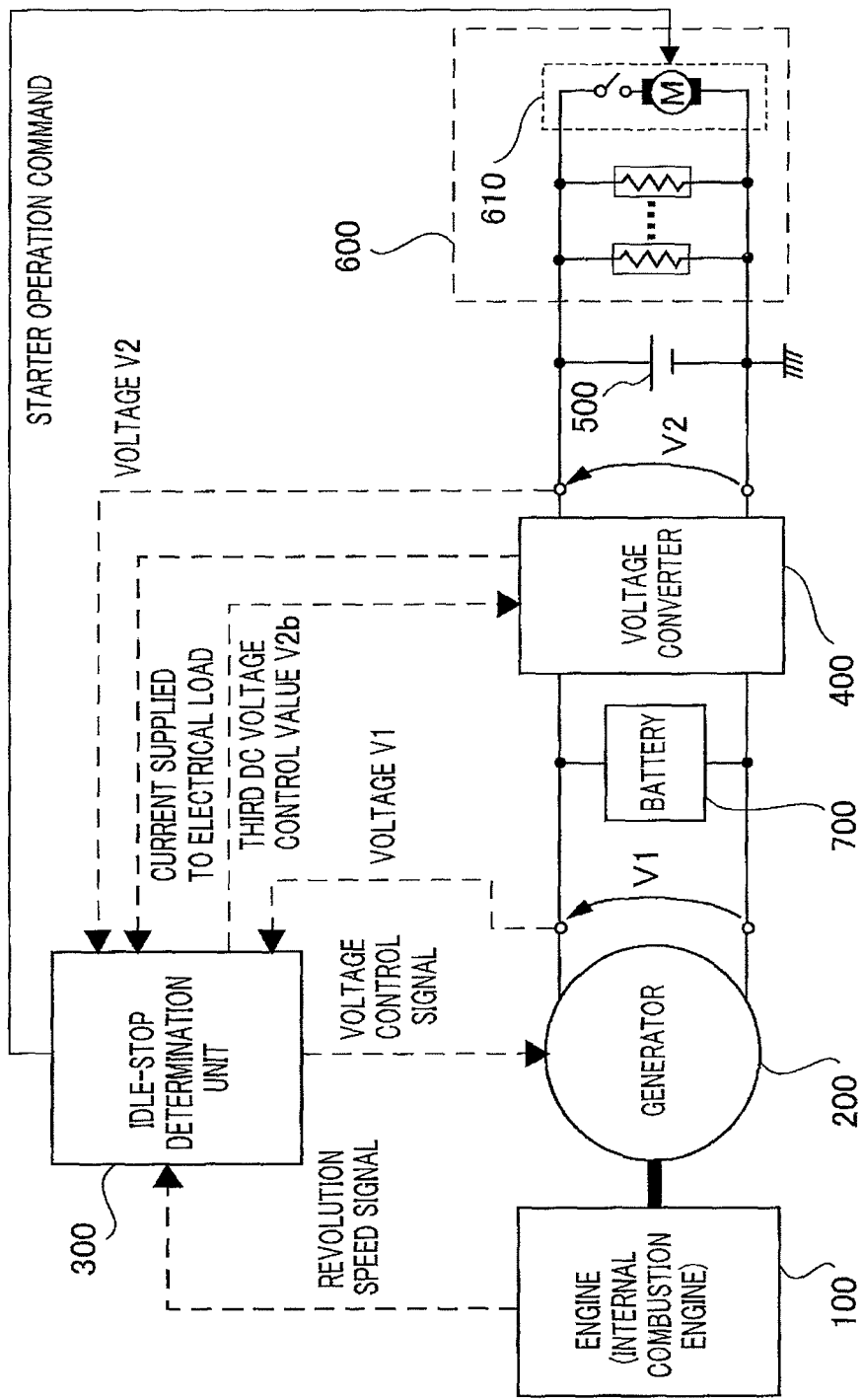
FIG. 8 is a diagram showing the configuration of a vehicular power supply device according to Embodiment 3 of the invention.

FIG. 8 is a configuration diagram for a vehicular power supply device according to Embodiment 3 of the present invention. This configuration differs from the configuration shown in FIG. 1 in that information on a current supplied to the electrical load from the voltage converter 400 is output to the idle-stop determination unit and the idle-stop determination unit outputs to the voltage converter 400 a third DC voltage control value V2*b*.

Figure 9:
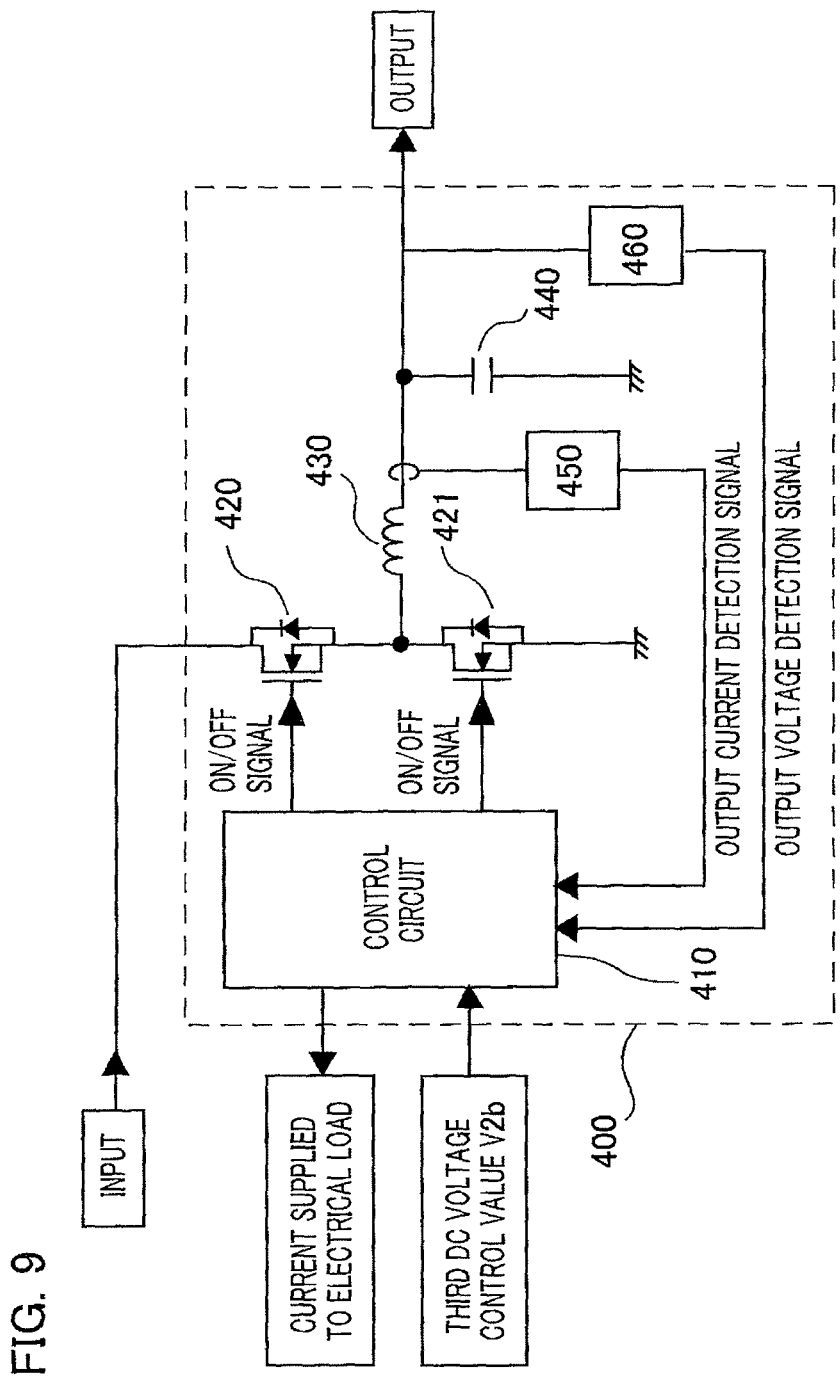
FIG. 9 is a diagram showing the configuration of a voltage converter according to Embodiment 3 of the invention.

FIG. 9 shows the configuration of a voltage converter 400 according to Embodiment 3 of the invention. The voltage converter 400 has the same configuration as that in FIG. 2; however they differ from each other in that the information on the current supplied to the electrical load, detected by the current detection means 450 is output to the idle-stop determination unit 300 from the control circuit 410 included in the voltage converter 400 and the idle-stop determination unit 300 inputs the third DC voltage control value V2*b* to the control circuit 410 of the voltage converter 400.

The voltage converter 400 according to this Embodiment 3, in the idle stop state, outputs to the idle-stop determination unit 300 the information on the current supplied to the electrical load, detected by the current detection means 450. Following that, the idle-stop determination unit 300 computes the third DC voltage control value V2*b* and outputs this third DC voltage control value V2*b* to the voltage converter 400. Then, the voltage converter 400 controls the DC voltage at the output side thereof to become the third DC voltage control value V2*b*. Moreover, in addition to detecting the electrical load of the vehicle using the same method as shown in Embodiment 1, the idle-stop determination unit 300 serves to control the vehicle as a whole; therefore the unit can grasp operation states of the electrical load including the wipers and the air conditioner. The idle-stop determination unit corrects the load, based on the grasped operation states, in such a way that if the detected electrical load is heavier than that detected in Embodiment 1, the load is decreased, whereas if lighter than that, it is increased, whereby more detailed states of the electrical load can be grasped. This allows the idle-stop determination unit 300 to find more detailed electrical load states of the vehicle; therefore the determination of the third DC voltage control value V2*b* by the idle-stop determination unit 300 can not only suppress the voltage drop at the lead battery attributed to the operation of the starter 610, but also reduce consumption of energy from the battery 700.

Since this Embodiment 3 is the same as Embodiment 1 and Embodiment 2 except for the difference described above, further explanation will be omitted.

Various modifications and alterations of this invention will be apparent to those skilled in the art without departing from the scope and spirit of this invention, and it should be understood that this is not limited to the illustrative embodiments set forth herein.

What is claimed is:

1. A vehicular power supply device mounted on a vehicle equipped with an idle stop function of stopping an engine when conditions for stopping the engine are met and starting the engine by operation of a starting means when conditions for starting the engine are met, the vehicular power supply device comprising:
   a generator connected to the engine, for generating a DC voltage;
   a voltage converter for converting the DC voltage output from the generator into a first DC voltage control value and outputting the value;
   a battery connected between the generator and the voltage converter;
   an electrical load including the starting means, supplied with a current and a voltage by way of the voltage converter;
   a lead battery charged with the output from the voltage converter, for supplying a current to the electrical load; and
   an idle-stop determination unit for determining whether or not the engine is in an idle stop state; wherein
   when the idle-stop determination unit determines that the engine is in the idle stop state, the voltage converter outputs, depending on the current and the voltage supplied to the electrical load, a DC voltage control value that is a target output voltage for the lead battery and higher than the first DC voltage control value.

2. A vehicular power supply device according to claim 1, wherein the DC voltage control value that is higher than the first DC voltage control value is obtained by adding to the first DC voltage control value a voltage computed in response to an increase in the electrical load including the operation of the starting means.

3. A vehicular power supply device according to claim 1, wherein the voltage converter includes a current detection means and a voltage detection means for detecting the current and the voltage supplied to the electrical load, respectively, and includes a voltage-conversion-control means that controls, when the idle-stop determination unit determines that the engine is in the idle stop state, the target output voltage for the lead battery to become a second DC voltage control value that is higher than the first DC voltage control value, based on an idle-stop-state signal output from the idle-stop determination unit and the detected values by the current detection means and the voltage detection means.

4. A vehicular power supply device according to claim 1, wherein when determining that the engine is in the idle stop state, the idle-stop determination unit computes a third DC voltage control value that is higher than the first DC voltage control value, based on the detected values by a current detection means and a voltage detection means included in the voltage converter, for detecting the current and the voltage supplied to the electrical load, respectively, and outputs the value to the voltage converter, and the voltage converter includes a voltage-conversion-control means for controlling, based on the input third DC voltage control value, the target output voltage for the lead battery to become the third DC voltage control value that is higher than the first DC voltage control value.

5. A vehicular power supply device according to claim 1, wherein the lead battery output voltage dropped attributed to the operation of the starting means when the conditions for starting the engine are met is raised by charging by the voltage converter, and when the lead battery output voltage becomes higher than the first DC voltage control value, the voltage converter is controlled so as to output the first DC voltage control value.

6. A vehicular power supply device according to claim 1, wherein when the lead battery output voltage dropped attributed to the operation of the starter means when the conditions for starting the engine are met is lower than the first DC voltage control value and the engine revolution speed becomes higher than a predetermined value, the voltage converter is controlled so as to output the first DC voltage control value.

* * * * *